July 30, 1963  J. S. ATOLS  3,099,093
ADJUSTABLE ANGLE DEVICE AND WORK HOLDER
Filed July 27, 1961  3 Sheets-Sheet 1
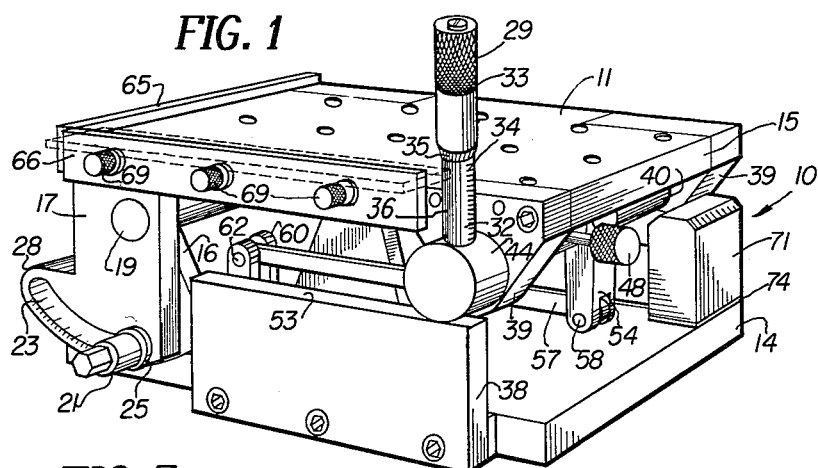
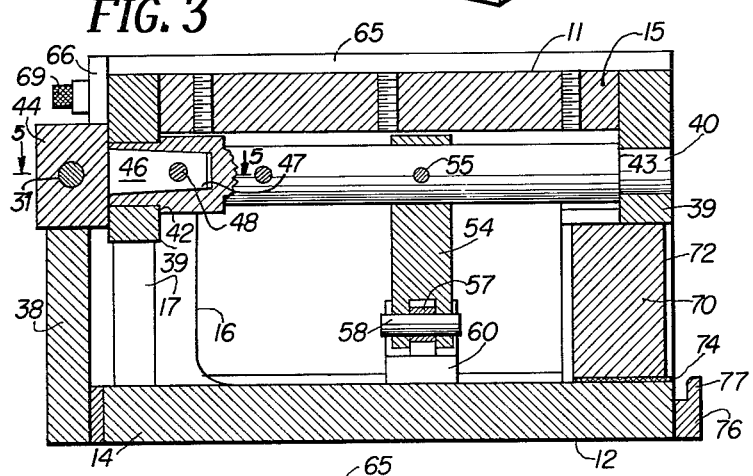
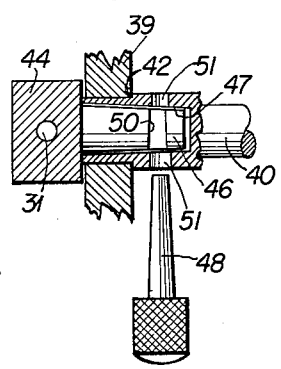
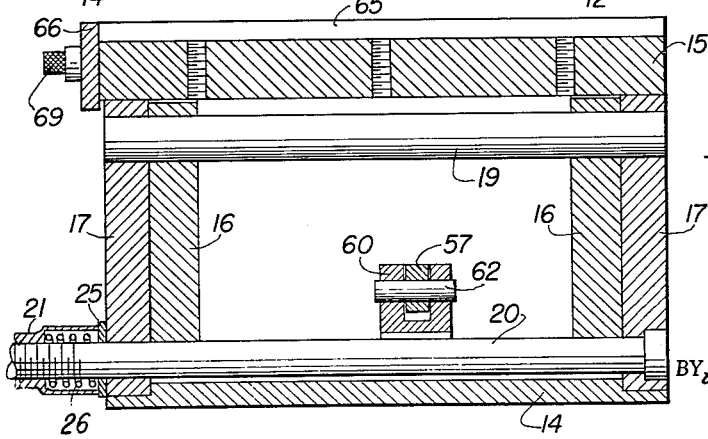
INVENTOR.
John S. Atols
BY Wolf, Hubbard, Voit + Osann
Attys.

July 30, 1963 J. S. ATOLS 3,099,093
ADJUSTABLE ANGLE DEVICE AND WORK HOLDER
Filed July 27, 1961 3 Sheets-Sheet 2

INVENTOR.
John S. Atols
BY *Wolfe, Hubbard, Voit & Osann*

Attys

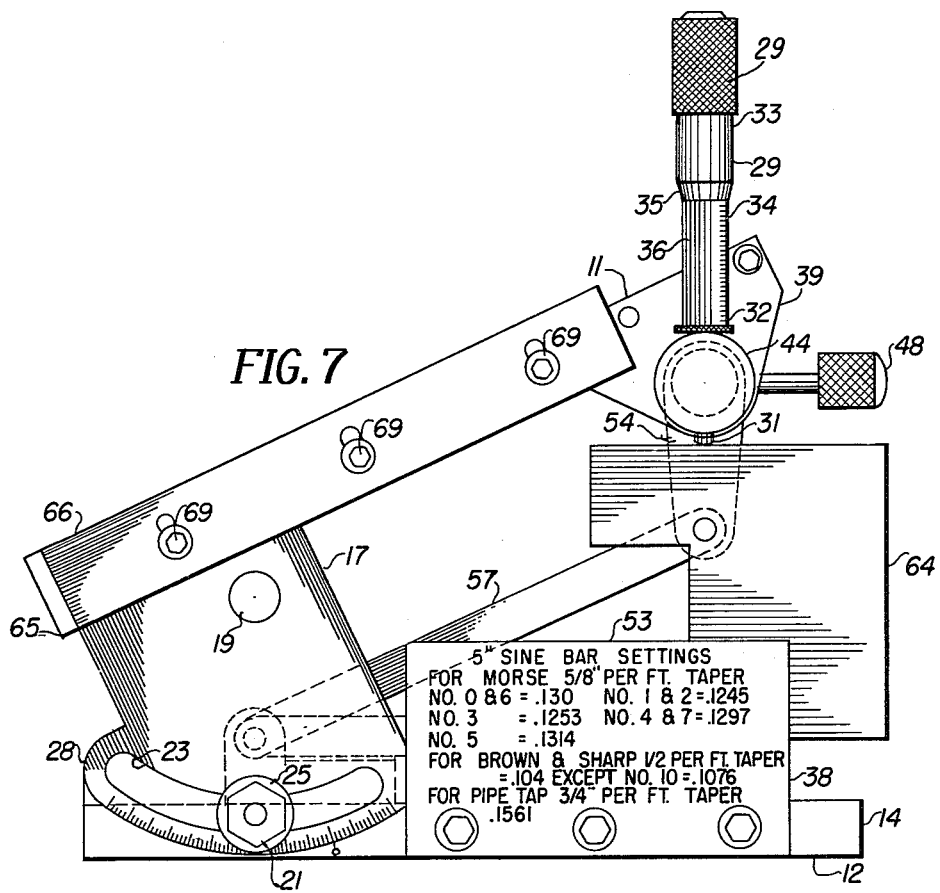
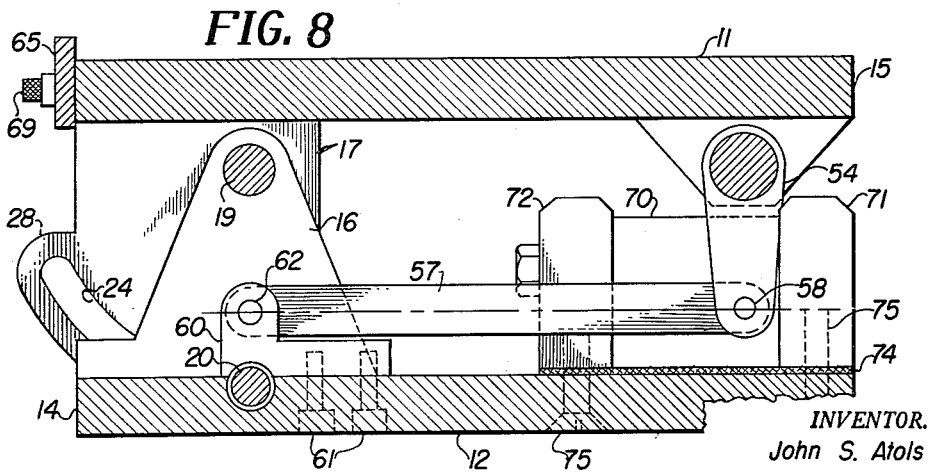

United States Patent Office
3,099,093
Patented July 30, 1963

3,099,093
ADJUSTABLE ANGLE DEVICE AND
WORK HOLDER
John S. Atols, 5009 W. Armitage Ave., Chicago 39, Ill.
Filed July 27, 1961, Ser. No. 127,279
10 Claims. (Cl. 33—174)

The present invention relates to devices for accurately measuring angles. It finds particular, although not exclusive, use for positioning workpieces and tools for machining operations.

Accurate measurement of angles, especially in the metal working fields, has generally been done by using individual gauge blocks of accurately known size to measure the respective distances of spaced projections or buttons on a bar from a reference surface such as a work table or surface plate. The difference between these distances and the spacing between the projections permits calculation of the angle between the bar, which is known as a sine bar, and the reference surface.

It is a principal object of the present invention to provide a self-contained device for accurately and quickly measuring angles. It is a related object to utilize a direct reading linear measuring instrument such as a micrometer in an angle measuring device for precision work.

It is a more detailed object of the present invention to incorporate a micrometer measuring instrument in an adjustable angle device such that the micrometer gives an accurate and direct reading of the difference between perpendicular distances from a reference surface of two points on a sine bar.

Another object of the present invention is to provide an angularly adjustable holder capable of accurately positioning and holding workpieces and tools at predetermined angles with a minimum of set-up time.

A further object is to provide a versatile work holder adapted to a wide variety of uses including the measurement of angles in different planes.

Other objects and advantages of the invention will become apparent from the following detailed description of the preferred embodiment illustrated in the accompanying drawings, in which:

FIGURE 1 is a perspective view of an angularly adjustable holder embodying the present invention;

FIG. 3 is a vertical section taken along the line 3—3 of FIG. 2;

FIG. 4 is a vertical section taken along the line 4—4 of FIG. 2.

FIG. 5 is a fragmentary section of the mounting for the micrometer taken along the line 5—5 of FIG. 3;

FIG. 7 is a side elevation of the holder of FIG. 1 showing the use of an extension block for measuring and setting large angles; and FIG. 8 is a vertical section taken along the line 8—8 of FIG. 2.

Figure 2:
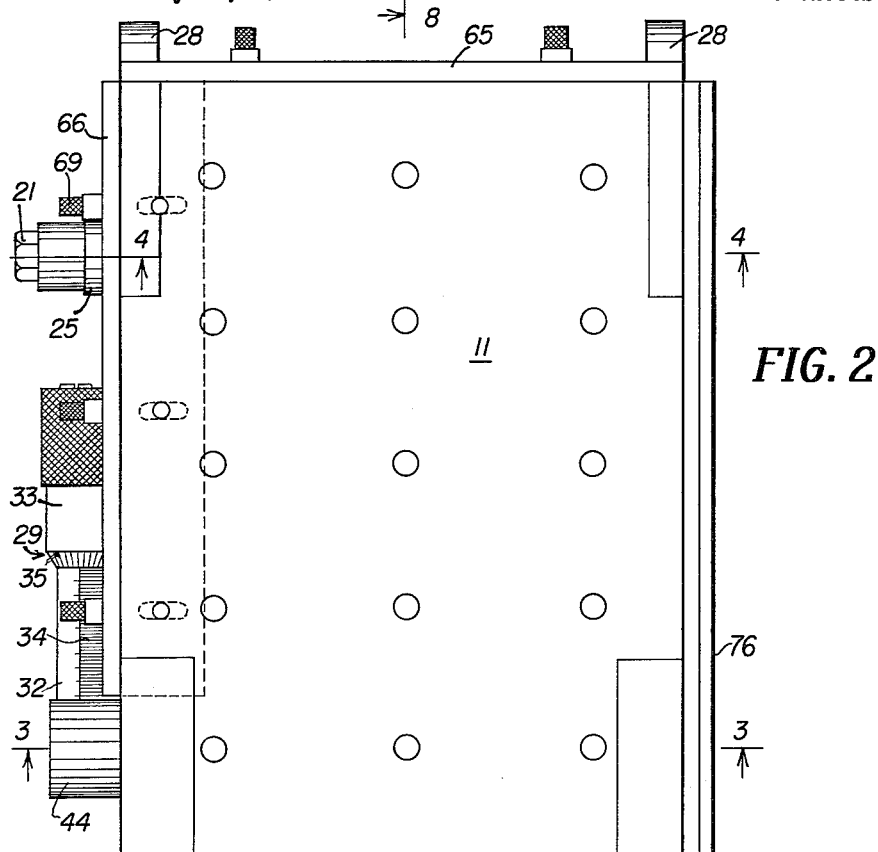
FIG. 2 is a plan view of the holder of FIG. 1 with the micrometer swung downwardly to provide a clear top surface.

While a single embodiment of the invention has been shown and will be described herein in detail, it is not intended that the invention be limited to such details, but the intention is to cover all modifications and adaptations falling within the spirit and scope of the invention as characterized in the appended claims.

With reference to the drawings, the present invention is embodied in an adjustable holder or angle plate 10 having upper and lower oppositely facing planar surfaces 11, 12 which form portions of the sides of an angle of variable size. Forming the planar surfaces are a pair of members 14, 15 constituting the base member and top member, respectively. Both members 14, 15 comprise rectangular plates of substantially the same dimensions, and in the preferred form have considerable surface area to give stable support to a workpiece mounted on the top plate 15.

Interconnecting the base and work supporting members 14, 15 are a pivot or hinge mechanism and an associated locking mechanism to permit angular adjustment to a desired position and thereafter securely locking the members against relative movement. In the illustrative device, the pivot or hinge mechanism is located adjacent one end of the base 14, referred to for convenience as the closed end of the device. The hinge is formed by two pairs of overlapping plates 16, 17 located at the sides of the base and top members adjacent the closed end. The hinge plates are perpendicular to the planar surfaces with two plates or arms 16 projecting upwardly from the base member 14 and the remaining two plates or legs 17 projecting downwardly from the top member 15 along the outer faces of the arms 16.

Each of the hinge plates 16, 17 have alined apertures for receiving a pivot or hinge pin 19. The apertures in the base hinge plates are equally spaced from the lower planar surface on the bottom of the base 14 and the apertures in the top hinge plates are likewise equally spaced from the top planar surface of the upper member 15. The hinge pin 19 is thus positioned parallel to both the top and bottom surfaces to insure parallelism of all crosswise elements lying in the planar surfaces.

Forming the locking mechanism for the angle plate are arcuate slots in the lower end portions of the depending hinge plates 17 and a transverse locking rod 20 and nut 21. The depending hinge plates or legs 17 extend downwardly from the top plate into arcuate offsets in the edges of the base member 14. The lower ends of the legs 17 are of complementary arcuate shape, the arc being formed with the axis of the hinge pin as the center so that the ends of the legs 17 will slide in the arcuate offset as the top member 15 is swung relative to the base 14. Extending across the base member directly below the hinge pin is the locking rod 20 which has a T-shaped head on one end and screw threads on the other for receiving the locking nut 21. Preferably the locking rod 20 is received in a transverse groove in the upper face of the base member 14 to increase the distance between the rod and the pivot axis for more secure locking action and also to leave the space between the base and top members open. The ends of the rod pass through apertures in the upstanding hinge plates 16 and arcuate slots 23, 24 in the depending hinge plates 17. The arcuate slots 23, 24 like the ends of the plates 17 are formed with the hinge axis as the center of the arc for relative movement of the top and bottom members. One of the slots 24 is relieved on both edges to receive the T-shaped head of the locking rod 20 and prevent the rod from turning. In order to conveniently identify the sides of the angle plate, the slot 24 is on the back side while the threaded end of the rod 20 projects through the slot 23 on the front side.

Completing the locking mechanism is the locking nut 21. If desired, a washer 25 may be interposed between the nut 21 and the outer face of the front hinge plate 17. To prevent the top member from slamming down upon loosening of the lock nut 21, a coil spring 26 is placed in a counterbore in the inner end portion of the nut 21. The spring 26 provides a gradual release of the frictional gripping force against the hinge plate 17 when the nut is loosened slightly, permitting the top member to be moved but holding it against falling under its own weight.

To provide for increased angular movement of the top member relative to the base member, the lower end portions of the top hinge legs 17 may be extended edgewise beyond the closed end of the angle plate, as at 28, to provide room for arcuate locking slots 23, 24 of greater length. As shown in FIG. 8 the lower end of the hinge legs 17 and the adjacent edge of the base member below the arcaute offset may also have inscribed degree marks and an index to give a course measurement of the angle of tilt of the top planar surface.

In accordance with the present invention means are provided for measuring the angle of tilt with precision required for most machining operations. For this purpose means for accurately measuring linear distances is mounted on the device to give a true measure of a given function, preferably the sine, of the angle of tilt of the top surface 11 relative to the base surface 12. In the illustrative embodiment of the drawings the measuring mechanism is a micrometer gauge 29 of well known construction and need not be described in detail. It is sufficient to note that the gauge 29 comprises a spindle 31 which moves axially relative to a hub 32 upon rotation of a thimble 33 which engages a screw thread on the hub. The hub 32 is marked in the usual way with crosswise graduations 34 representing fractions of an inch equal to the pitch of the screw thread. The lower edge of the thimble has short lengthwise marks 35 equally spaced about its periphery to measure fractions of a turn. Longitudinal vernier markings 36 for precision measurements may also be used. Cooperating with the gauge is an anvil or reference plate 38 against which the gauge spindle abuts.

The angle of tilt of the top surface relative to the base is determined mathematically in the manner used in connection with the well known machinists' sine bar. For this determination a fixed distance is marked on the sine bar, usually a distance of five or ten inches. The perpendicular distances between each of the marks and a base surface are then measured. The difference between the two perpendiculars divided by the distance marked on the bar equals the sine of the angle between the bar and the base surface.

In the present instance a length corresponding to the marked distance on the sine bar and one of the perpendicular distances are kept constant. As a result, only the remaining perpendicular must be measured to determine the sine of the angle, and hence the angle itself. For this purpose the micrometer gauge 29 is pivotally mounted on the top member 15 below the top planar surface 11 a distance equal to the distance of the axis of the hinge pin or rod 19 below the surface of the top plate such that a line of centers between the axis of the pivot and hinge pin 19 is parallel to the top plate surface. The distance between the two axes is preferably made either five or ten inches although other distances may be used so long as the distance is accurately measured.

To form a pivotal mounting for the micrometer gauge 29, the end portion of the top plate member 15 opposite the hinged end has a pair of depending projections or legs 39, one on each side of the plate 15. The legs are in the illustrative device generally triangular in outline and have alined holes for journalling a supporting pivot rod 40. As shown in FIG. 3 the respective end portions of the pivot rod 40 pass through the thickness of the respective legs 39 with the outer end faces flush with the outer faces of the legs. Each end portion has an outwardly facing shoulder 42, 43 which bears against the inner face of its respective leg to hold the rod against axial displacement.

Figure 6:
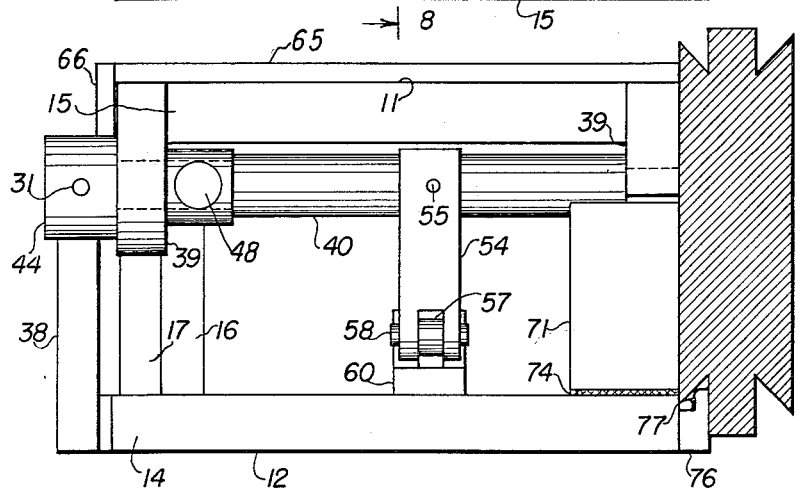
FIG. 6 is an end view of the holder of FIG. 1 illustrating its use with the slide of a lathe taper attachment.

Means are provided for mounting the micrometer gauge 29 on the pivot rod 40 such that the micrometer gauge may be removed or turnd down, as in FIGS. 2 and 6, to provide a clear work surface on the top member 15, and at the same time to hold the gauge in a precisely located position for measuring. To accomplish this the micrometer hub or barrel 32 is fastened to the side of a cylindrical block or button 44 with the spindle 31 of the micrometer extending diametrically through the block. Projecting from the inner end face of the block and coaxial with the block is a tapered plug 46 adapted to fit into an axial tapered bore 47 of the pivot rod 40. As shown in FIGS. 3 and 5 the micrometer end of the pivot rod 40 may have an increased diameter to provide sufficient stock for forming the tapered bore 47.

To position the micrometer gauge in an upright position and to insure accurate seating of the taper plug 46 a tapered retaining pin 48 is inserted in matching tapered holes 50, 51 extending crosswise of the plug 46 and the bored end of the pivot rod 40.

Snug and accurate seating of the tapered plug is accomplished by offsetting slightly the retaining pin holes 50, 51 in the plug and pivot rod. As shown in FIG. 5 the retaining pin hole 50 in the end of the plug 46 is offset with respect to the pin receiving holes 51 in the pivot rod by a small amount, for example, a small fraction of the retaining pin hole diameter and in a direction away from the bottom of the bore 47. When the retaining pin 48 is inserted, the tapered sides of the pin 48 force the plug 46 into the bore 47 to take up any slack or looseness which might otherwise exist.

Cooperating with the micrometer gauge 29 is an anvil block or plate 38 fastened to the base plate 14 in vertical side to side alinement with the micrometer spindle. The upper edge or surface 53 of the anvil block is precisely positioned to be parallel with the bottom planar surface 12 of the base 14 and is sufficiently long to have a portion directly under the spindle 31 at all angles through which the top plate 15 is swung.

Since the sine of an angle of zero degrees is zero, that is, when the top plate and base are parallel, the anvil block 38 has a height such that its top edge surface 53 is in contact with the micrometer spindle 31 at zero reading of the micrometer gauge when the top plate is parallel to the base. As a convenient check on the micrometer setting, the micrometer supporting block 44 has a cylindrical radius equal to the distance between the axis of the micrometer pivot support rod 40 and the anvil surface 53 when the top planar surface 11 and base surface 12 are parallel. Thus the micrometer gauge 29 may be adjusted to give a zero reading when the spindle end is flush with the cylindrical side of the supporting block 44.

To further insure that the micrometer accurately measures the vertical leg of the sine of the angle between the top planar surface 11 and the base surface 12, means are provided to maintain the spindle axis of the micrometer gauge perpendicular with respect to the anvil surface 53 of the anvil block 38. In the illustrative embodiment of the invention this means comprises a parallel linkage. With reference to FIG. 8 of the drawings, the linkage comprises a depending crank arm 54 rigidly fixed by a pin 55 to the micrometer supporting pivot rod 40. The lower end of the crank arm 54 is slotted to receive one end of a levelling link 57 which is pivotally connected to the arm 54 by a transverse pivot pin 58. The second end of the levelling link 57 is pivotally connected to the base plate 14 on a transverse axis positioned on a line intersecting the axis of the hinge pin 19 perpendicular to the lower planar surface 12. The transverse axis is spaced below the hinge pin axis a distance equal to the effective length of the crank arm, that is, the distance between the axes of the micrometer supporting rod 40 and the pivot pin 58 for the first end of the levelling link 57. With the pivot connection so located, the length of the levelling link between the axes of its two end pivots is equal to the distance between the axes of the top plate hinge pin and the micrometer supporting rod.

The pivotal connection for the second end of the levelling link 57 is formed by an L-shaped bracket 60, the longer leg of which is fastened, as by screws 61, to the upper face of the base plate 14 in side to side alinement with the micrometer rod crank arm 54. The shorter leg of the bracket 60 projects upwardly and is slotted to receive the second end of the levelling link 57. A transverse pivot pin 62 passing through alined holes in the upright leg of the bracket 60 and the end of the levelling link 57 completes the pivotal connection which as previously explained is on the perpendicular from the hinge pin axis and spaced therebelow a distance equal to the effective length of the micrometer supporting rod crank arm 54.

It will be seen that a linkage is thus formed having a relatively stationary leg perpendicular to the base surface and three relatively movable links comprising a top plate link formed by the top plate and its depending legs 17, 39 to the hinge pin 19 and micrometer supporting rod 40, respectively, a crank arm link 54, and a levelling link 57. Since the relatively stationary leg is perpendicular to the base surface, the crank arm link 54 will also remain perpendicular to the lower planar surface 11 and the anvil block surface 53 which is parallel to the latter.

To further guard against inaccuracy of measurement of the angle between the top and bottom planar surfaces 11, 12, provision is made to compensate for possible small angular displacements of the micrometer spindle 31 from the perpendicular such as might result from clearance in the pivotal connections of the linkage. This is accomplished by forming a spherical contour on the end of the micrometer spindle. In the preferred embodiment the radius of the spherical contour is equal to the distance from the axis of pivoting of the micrometer to the end of the spindle at its maximum length. By thus rounding the end of the spindle any slight tilt of the micrometer axis from the perpendicular is compensated for, at least within the accuracy of the micrometer itself.

In the preferred construction shown in the drawings the perpendicular links, including the stationary link and the crank arm 54, have a length also equal to the radius of spherical contour on the end of the spindle. By way of illustration the length of the perpendicular links, the spherical radius, and the maximum extension of the micrometer spindle measured from its axis of pivoting are all one and a half inches. The distance between the axes of the hinge pin 19 and the micrometer pivot rod 40 is five inches and equal to the distance between the axes of the pivotal connections at the ends of the levelling rod. The micrometer supporting cylinder block 44 has a radius equal to the distance of the hinge pin axis 19, above the anvil reference surface 53. With such proportions, accuracy within the limits of accuracy of the micrometer gauge itself can be attained in a compact angle plate device.

The range of sizes of angles which can be measured can be extended by use of a linear gauge having a sufficiently long spindle travel. However, micrometer gauges of convenient size usually have a maximum spindle of one inch. To increase the range of measurement an extension block of known height having parallel edges may be inserted between the micrometer spindle 31 and the anvil block reference surface 53. An extension block 64 for this purpose is illustrated in FIG. 7. The block there shown has two straight edges perpendicular to each other with a third edge offset to form steps of equal height and depth. The faces of the steps are formed parallel to the respective straight edges of the block. Preferably each step is one inch by one inch, giving extensions of one, two, and three inches for the block as shown in FIG. 7. For measuring a given angle, the micrometer reading is added to the height of the particular step used, giving a maximum height of four inches for a one inch micrometer and a gauge block which is three inches high. With a distance of five inches between the axes of the hinge pin 19 and the micrometer pivot 40, this permits measurement up to an angle slightly greater than fifty-three degrees.

In another aspect of the present invention, means are provided for enlarging the useful applications of an angle plate. For this purpose, the top member is provided with adjustable guide or positioning means in the form of side rails 65, 66 along edges of the top planar surface 11. Two such rails are shown in the drawings at the side and end, respectively, of the top member 15. The rails 65, 66 comprise rectangular strips having mounting holes 68 spaced to mate with threaded holes in the edges of the top member. Fasteners, such as screws 69, removably hold the guide rails to the top member. Preferably the mounting holes 68 in the guide rails 65, 66 are elongated transversely of the rails to permit up and down adjustment relative to the top planar surface 11. Additional screw threaded holes are provided in the top planar surface adjacent its edges to permit mounting the rails thereon with a portion projecting beyond the side of the work surface, as shown in dash outline in FIG. 2 of the drawings.

The exemplary angle plate of the drawings is further constructed to permit the measurement of horizontal as well as vertical angles. To accomplish this, the locking nut 21, micrometer gauge 29, and anvil block 38 are mounted on the front side of the device, and the back edges of the base and top members 14, 15 are formed to lie in a common plane perpendicular to the upper and lower planar sides 11, 12. The hinge legs 16 and micrometer rod support legs 39 in the construction of the drawing are mounted with their outer sides flush with the edges of the top member 15 such that there are no elements projecting beyond the rear edges of the top member. The angle plate may thus be supported either on the lower planar surface 12 or on its rear side with the measuring and locking means equally accessible in either position.

To stabilize the angle plate device when used in a vertical position, magnetic means are mounted adjacent the back side to grip magnetically a work table or machine slide on which the plate may be placed. In the preferred form shown in the drawings, the magnetic means comprises a permanent bar magnet 70 having a pair of end plates 71, 72 of magnetic material fastened thereto. The bar magnet 70 is offset inwardly from the back edge of the base and the end plates 71, 72 which form the poles of the magnet are flush with the edge to provide direct contact with the surface on which the angle plate may be positioned. A strip or shim 74 of nonmagnetic material is inserted between the magnet assembly and the base plate to prevent the magnetic flux from going through the base. A pair of nonmagnetic fasteners, such as brass screws 75 hold the assembly to the base.

Since it is often desirable to use the angle plate in its vertical position to measure angles with respect to the edge of a work table or machine tool guide, means are also provided for positioning the base of the angle plate parallel to such edges and guides. This positioning means is formed by an undercut bar 76 fastened to the base 14 along its lower back edge. Preferably the lower side of the positioning bar 76 is in the same plane as the bottom surface 12 of the base. The upper side of the bar 76 is relieved or offset downwardly adjacent the base to form an upstanding lip or shoulder 77 which defines a slot between the shoulder and the back side of the base. As shown in FIG. 6, the slotted construction is particularly useful in connection with bevelled guides, as, for example, on a taper attachment on a machine lathe. For precise positioning of the angle plate with respect to the guide, the contacting parts are the lip 77 of the positioning bar and the bevelled side of the guide, rather than the sharp corner edge, which may be damaged through use.

It will be evident from the foregoing description that the present invention provides not only an accurate and rapid mechanism for measuring angles, but also a versatile and improved device for holding and positioning workpieces and tools.

I claim as my invention:

1. An adjustable angle measuring device comprising in combination first and second members pivotally connected to each other for relative angular swinging movement and having respective plane surfaces thereon, means for measuring linear distances, means for pivotally mounting said measuring means on one of said members a predetermined distance from the pivotal connection between said members, a coacting surface on the other of said members parallel to the plane surface thereon for cooperation with said measuring device to measure the distance between said members, and parallel linkage means including a link pivotally interconnected at its respective end portions on axes parallel to the axis of said mounting means to a point on the other of said members and to a point on said mounting means offset from the axis of pivoting of the latter for maintaining the linear axis of said measuring means perpendicular to said coacting surface whereby said measuring means accurately measures the sine function of the angle between said plane surfaces.

2. An adjustable angle device comprising in combination first and second members defining respective plane surfaces thereon, hinge means interconnecting said members for relative angular movement of the latter, means for directly measuring linear distances pivotally mounted on the first of said members on an axis parallel to but spaced from the axis of said hinge means a predetermined distance and positioned such that the line of centers of said hinge means and said pivot is parallel to the plane surface on said first member, means defining a reference surface on said second member parallel to the plane surface thereon for coaction with said measuring means, and means for maintaining the linear axis of said measuring means perpendicular to said reference surface including a crank arm fixed to said measuring means and a link interconnecting said arm and a point on said second member, said crank arm having a length equal to the distance between said point and the axis of said hinge means and said link having a length equal to the distance between said hinge axis and the axis of pivoting of said measuring means, said measuring means and said reference surface being arranged to provide a zero measurement when said plane surfaces are parallel whereby said measuring means directly measures a function of the angle between said plane surfaces.

3. An angle measuring device comprising in combination first and second members having oppositely facing plane surfaces, means pivotally connecting said members for relative angular swing, measuring means having a linearly movable element, means for pivotally mounting said measuring means on said first member a predetermined distance from said connecting means, a reference surface on said second member parallel to the plane surface thereon for coaction with the end of said movable element, and means including a leveling link having a length equal to said predetermined distance and pivotally interconnecting a point on said mounting means offset from the pivotal axis thereof and a point on said second member, the line of centers of said interconnected points being parallel to the line of centers of the axes of said mounting means and of said means pivotally connecting said first and second members for maintaining said movable element perpendicular to said reference surface, the end of said movable element having a convex spherical contour to compensate for variations of said movable element from exact perpendicular relation to said reference surface for accurate measurement of the vertical side of the angle between said plane surfaces.

4. An adjustable angle device comprising in combination first and second members defining oppositely facing plane surfaces and being pivotally interconnected for relative angular movement, linear measuring means including a linearly movable spindle pivotally mounted on the first of said members on an axis parallel to the axis of said hinge means and spaced therefrom a predetermined distance, said second member having a reference surface parallel to the plane surface thereon for coaction with the end of said spindle to measure a function of the angle between said plane surfaces, and means for maintaining the linear axis of said spindle perpendicular to said reference surface including a crank arm fixed to said measuring means and a link interconnecting said arm and a point on said second member, said crank arm having a length equal to the distance of said point to the axis of said hinge means, said link having a length equal to the distance between the axis of pivoting of said members and of said measuring means, the end of said spindle having a convex spherical contour with a radius substantially equal to the length of said crank arm to compensate for tilt of said spindle from exact perpendicular relation to said reference surface.

5. A self-contained sine bar device comprising in combination first and second members having plane surfaces thereon, hinge means interconnecting said members for relative angular swing, a linear micrometer measuring means having a hub and a linearly movable spindle, a rod pivotally mounted on said first member for supporting said measuring means, the axes of said rod and said hinge means being parallel and equally spaced from the plane surface of said first member, means for removably mounting said measuring means on said rod including a cylindrical member having a coaxial tapered projection, one end of said rod having an axial bore of complemental taper to receive said projection, a retaining pin, said projection and said end of said rod having transverse holes for receiving said retaining pin, the hole in said projection being slightly offset from the hole in said rod in a direction away from the bottom of said bore, said retaining pin being tapered for pulling and firmly seating said projection in said bore upon inserting said pin into said holes, said second member having an anvil surface parallel to the plane surface thereon for coacting with the end of said spindle, and parallel linkage means including a link fixed relative to said second member perpendicularly to said anvil surface, a crank arm on said rod parallel to said fixed link and a link parallel to the line of centers between the axes of said hinge means and said supporting rod interconnecting said fixed link and said crank arm, the hub of said measuring means being fixed to said cylindrical member such that the linear axis of said spindle intersects the axis of said supporting rod and is parallel to said crank arm for maintaining the spindle of said measuring means perpendicular to said reference surface upon relative swing of said first and second members.

6. An adjustable angle plate comprising in combination first and second plates hinged together for relative angular movement, a linear measuring mechanism, means for pivotally mounting said measuring mechanism on said first plate on an axis positioned a predetermined distance from the pivot axis of said hinge and parallel thereto, a crank arm rigidly fixed to said measuring mechanism, a levelling link interconnecting said crank and a point on said second plate and having an effective length equal to said predetermined distance, said point on said second plate being spaced from said hinge axis a distance equal to the effective length of said crank, a reference surface rigid with said second plate and parallel thereto for coaction with said measuring mechanism such that the quotient of a reading on said measuring mechanism and said predetermined distance is a function of the angle between said first and second plates.

7. An adjustable angle plate comprising in combination a base member having a planar bottom surface and a pair of upstanding projections adjacent one end at the respective sides thereof, a top plate member having a planar upper surface and a pair of depending legs adjacent one end thereof, said legs being spaced apart to overlap the outer faces of the respective upstanding projections on said base member, said legs and upstanding projections having alined holes, a hinge pin received in said holes for pivotally connecting said members, the lower ends of said legs each defining an alined arcuate slot, locking means including a rod extending through said projections and said slots, said rod being enlarged on one end and having a threaded locking nut on the other for frictionally engaging and locking said members in selected angular relation, means including a linear measuring device pivotally mounted on one side of the top plate at a predetermined distance from the axis of said hinge pin means and a parallel linkage including a crank arm connected to said measuring device and a leveling link pivotally interconnecting said arm and a point on said second plate for maintaining the linear axis of said measuring device perpendicular to the bottom surface of said base member for measuring the relative angle between said members.

8. An adjustable angle plate comprising in combination a base member having a planar bottom surface, a top plate having a planar top surface, upstanding projections adjacent one end of said base member, depending legs adjacent the coresponding end of said top plate overlapping said projections, a transverse hinge pin extending through said projections and legs for pivotally connecting said members for relative angular swing, a micrometer measuring means having a linearly movable spindle, means for pivotally mounting said measuring means on the front side of said top plate adjacent the second end thereof, parallel linkage means for maintaining said movable spindle perpendicular to said planar bottom surface upon relative swing of said members for accurately measuring the relative angle therebetween, the back sides of said members being in a common plane perpendicular to said top and bottom planar surfaces, magnetic means having pole pieces in said common plane for holding said angle plate to a work table when resting on said back side, and a positioning bar extending along the back side of said base member, said bar having a longitudinal edge parallel to said bottom planar surface, the portion of said edge adjacent said base member being offset downwardly to define a lip spaced from said base member for accurately alining the angle plate with a selected surface.

9. An adjustable angle plate as defined by claim 6 in which said linear measuring device has a linearly movable spindle having an end of convex spherical shape for coaction with said reference surface.

10. An adjustable angle plate comprising in combination first and second rectangular plates having outwardly facing planar surfaces, each of said plates having inwardly extending projections adjacent one end thereof, said projections of said first plate overlapping the said projections of said second plate, hinge pin means interconnecting said projections for relative angular swing of said plates, locking means including an arcuate slot defined by one of said projetcions and a threaded rod and nut means extending through an adjacent overlapping projection and said slot for frictionally engaging and locking said projections at a selected angular relation of said plates, means adjacent the second end of said plates including a linear measuring device pivotally mounted on one of said plates on an axis parallel to said hinge pin means for measuring a function of the angle between said plates, and means for maintaining said linear measuring means perpendicular to the planar surface of the other of said plates including a crank arm on said measuring means and a leveling link pivotally interconnecting said crank arm and the other of said plates.

References Cited in the file of this patent

UNITED STATES PATENTS

| | | |
|---|---|---|
| 2,113,874 | Chanik | Apr. 12, 1938 |
| 2,357,329 | Hansen | Sept. 5, 1944 |
| 2,373,578 | Lewis | Apr. 10, 1945 |
| 2,771,821 | Beusch | Nov. 27, 1956 |